US012800424B2

(12) United States Patent
Hussain et al.

(10) Patent No.: US 12,800,424 B2
(45) Date of Patent: Nov. 17, 2026

(54) METHOD OF CHARACTERISING A FAILURE EVENT IN A PRESSURISED FLUID DUCT

(71) Applicant: ROLLS-ROYCE PLC, London (GB)

(72) Inventors: Zahid M Hussain, Derby (GB); Peter T Ireland, Oxford (GB); David Bacci, Oxford (GB)

(73) Assignee: ROLLS-ROYCE plc, London (GB)

( * ) Notice: Subject to any disclaimer, the term of this patent is extended or adjusted under 35 U.S.C. 154(b) by 350 days.

(21) Appl. No.: 18/741,159

(22) Filed: Jun. 12, 2024

(65) Prior Publication Data

US 2025/0003825 A1 Jan. 2, 2025

(30) Foreign Application Priority Data

Jun. 27, 2023 (GB) ..................................... 2309652

(51) Int. Cl.
*G01M 3/24* (2006.01)
*G01M 15/14* (2006.01)
*G01S 5/22* (2006.01)

(52) U.S. Cl.
CPC ............ *G01M 3/243* (2013.01); *G01M 15/14* (2013.01); *G01S 5/22* (2013.01)

(58) Field of Classification Search
CPC ........... G01H 3/00; G01M 3/24; G01M 3/243
See application file for complete search history.

(56) References Cited

U.S. PATENT DOCUMENTS 4,083,229 A 4/1978 Anway
9,164,065 B2 10/2015 Hood et al.
9,812,926 B1 * 11/2017 Rodriguez ................ F03D 9/00
(Continued)

FOREIGN PATENT DOCUMENTS

CN 107063584 A 8/2017
CN 109061421 A 12/2018
WO 2013/066775 A1 5/2013

OTHER PUBLICATIONS

Nov. 1, 2023 Search Report issued in British Patent Application No. 2309651.4.
(Continued)

*Primary Examiner* — Long T Tran
(74) *Attorney, Agent, or Firm* — Oliff PLC

(57) ABSTRACT

A pressurised fluid duct failure event characterising method including: monitoring acoustic signals; detecting a failure event occurrence based on an acoustic signal exceeding a first failure threshold, and identifying a failure marker; estimating, for each acoustic signal, a failure detection time, based on the failure marker and a rate of change in sound pressure level for each acoustic signal; determining an acoustic weighted position for acoustic sensors; determining an estimate of a region containing the failure event as a first sub-volume of the duct based on the acoustic weighted position and a predetermined relationship between sound pressure level and regions of the duct; calculating, for each acoustic signal, one or more spectral characteristics; and determining at least one failure characteristic based on a comparison between the one or more spectral characteristics, the estimate of the region containing the failure event, and one or more predefined failure event parameters.

17 Claims, 5 Drawing Sheets

(56) References Cited

U.S. PATENT DOCUMENTS

| | | | | |
|---|---|---|---|---|
| 10,704,982 | B2 * | 7/2020 | Cole | G01M 3/2815 |
| 11,333,636 | B2 * | 5/2022 | Langnes | E21B 47/10 |
| 11,661,859 | B2 * | 5/2023 | Adibhatla | F01D 17/04 701/100 |
| 2006/0283190 | A1 * | 12/2006 | Thomassin | G01M 15/14 60/803 |
| 2011/0219741 | A1 | 9/2011 | Ernst et al. | |
| 2014/0260638 | A1 | 9/2014 | Hood et al. | |
| 2016/0208716 | A1 | 7/2016 | Bewick | |
| 2016/0320219 | A1 * | 11/2016 | Hellevang | G01F 1/74 |
| 2017/0260871 | A1 * | 9/2017 | Schmidt | G01N 29/48 |
| 2019/0186383 | A1 * | 6/2019 | Graham | F04D 27/001 |
| 2020/0300111 | A1 * | 9/2020 | Hussain | G01M 15/14 |
| 2020/0386648 | A1 * | 12/2020 | Luccini | G01M 3/243 |
| 2021/0116320 | A1 | 4/2021 | Shenouda | |
| 2022/0334020 | A1 * | 10/2022 | Ghazavi | G01M 3/243 |
| 2022/0412835 | A1 | 12/2022 | Sewell et al. | |
| 2023/0071544 | A1 | 3/2023 | Perrodin et al. | |
| 2023/0228384 | A1 * | 7/2023 | Okutsu | F17D 5/00 340/500 |
| 2023/0324244 | A1 * | 10/2023 | Krywyj | G01F 1/66 73/53.01 |

OTHER PUBLICATIONS

Nov. 1, 2023 Search Report issued in British Patent Application No. 2309652.2.

U.S. Appl. No. 18/741,216, filed Jun. 12, 2024 in the name of Zahid M Hussain et al.

Chenyu Zhang et al. "Weighted Block L1 Norm Regularized Two-Dimensional Off-Grid Compressive Beamforming for Acoustic Source Identification". 2022 5th International Conference on Information Communication and Signal Processing (ICICSP), IEEE, Nov. 26, 2022, pp. 1-5.

Aug. 4, 2026 Notice of Allowance received in U.S. Appl. No. 18/741,216.

* cited by examiner

METHOD OF CHARACTERISING A FAILURE EVENT IN A PRESSURISED FLUID DUCT

CROSS-REFERENCE TO RELATED APPLICATIONS

This specification is based upon and claims the benefit of priority from UK Patent Application Number 2309652.2 filed on Jun. 27, 2023, the entire contents of which are incorporated herein by reference.

FIELD

The present disclosure relates to a method of characterising a failure event in a pressurised fluid duct and a system for detecting a failure event in a pressurised fluid duct.

BACKGROUND

Turbomachine engines comprise one or more pressurised fluid ducts configured to carry fluids under pressure. For example, an engine may comprise a pressurised air duct or pipe for providing cooling air to the turbines. It is important to be able to quickly detect any failures that may occur in a pressurised fluid duct. For example, a pressurised fluid duct may burst or leak excessively. Failure in these ducts can result in adverse effects on other engine systems. For example, if a pressurised air duct for providing cooling air to turbines fails, turbine systems may overheat due to an inadequate supply of cooling air being provided.

Failure in pressurised fluid ducts are managed by designing turbomachine engine systems to be able to withstand a range of possible events and taking mitigating action before failure occurs. For example, temperature and pressure within a pressurised fluid duct may be closely monitored using sensors, and mitigating actions may be taken when the temperature and pressure reach undesirable levels, e.g., by opening a vent when the pressure is too high.

Whilst such an approach can be effective, it also carries some drawbacks. For instance, relatively minor leaks in the pressurised fluid duct may not be detected because they may not cause variations in temperature or pressure which exceed a defined threshold. This can result in long periods of undetected failure, which can cause damage to the engine. In addition, failure in the pressurised fluid duct may occur at locations which are relatively far from the positions of sensors. This may mean that the time taken to detect the failure event could be significant, resulting in damage being caused to the engine prior to detection.

It is therefore desired to develop an improved failure detection method which addresses one or more of the aforementioned problems.

SUMMARY

According to a first aspect, there is provided a method of characterising a failure event in a pressurised fluid duct, comprising: monitoring a plurality of acoustic signals, each acoustic signal of the plurality of acoustic signals corresponding to a recording of sound waves by a respective microphone in an environment of the duct, wherein each microphone is located at a predetermined position relative to the duct; detecting that a failure event in the duct has occurred based on an acoustic signal of the plurality of acoustic signals exceeding a first failure threshold, and identifying a failure marker as a time at which the failure event is detected; estimating, for each acoustic signal of the plurality of acoustic signals, a failure detection time, based on the failure marker and a rate of change in sound pressure level for each acoustic signal; determining an acoustic weighted position for the plurality of acoustic sensors based on the respective failure detection time for each acoustic signal and the position of each microphone; determining an estimate of a region containing the failure event as a first sub-volume of the duct based on the acoustic weighted position and a predetermined relationship between sound pressure level and regions of the duct; calculating, for each acoustic signal of the plurality of acoustic signals, one or more spectral characteristics; and determining at least one failure characteristic of the failure event based on a comparison between the one or more spectral characteristics, the estimate of the region containing the failure event, and one or more predefined failure event parameters.

The at least one failure characteristic may comprise at least one of a burst aperture area and a Mach number.

The one or more predefined failure event parameters may comprise one or more empirical relationships relating to a time taken for a microphone to measure a predefined sound pressure level in a pressurised fluid duct.

The first failure threshold may be based on historical characteristics of failure events in a pressurised fluid duct.

Estimating the failure detection time may comprise identifying a sample of the acoustic signal around the failure marker; calculating a root-mean-square (RMS) pressure signal of the sample and determining a rate of change in the RMS pressure signal; and identifying the failure detection time as a time of occurrence of a peak of the rate of change of RMS pressure which exceeds a second failure threshold.

The second failure threshold may be a predetermined threshold for RMS pressure based on empirical characteristics of failure in pressurised fluid ducts.

Determining at least one failure characteristic of the failure event may be based on a comparison between the one or more spectral characteristics, the estimate of the region containing the failure event, the one or more predefined failure event parameters, and one or more RMS pressure characteristics based on the RMS pressure signal.

Determining the acoustic weighted position may comprise: assigning an acoustic weight to each microphone based on a comparison between the respective failure detection time for the respective acoustic signal and an earliest failure detection time of the plurality of acoustic signals; and calculating the acoustic weighted position as a weighted average of the respective positions of the plurality of microphones, wherein the respective acoustic weight of each microphone is used to calculate the weighted average.

The predetermined relationship between sound pressure level and regions of the duct may comprise an empirical relationship describing a variation in time taken for sound pressure level to change from a first level to a second level based on a region of the duct.

Determining the estimate of a region of the duct containing the failure event as a first sub-volume of the duct may comprise: determining a preliminary estimate of the region containing the failure event based on the predetermined relationship between sound pressure level and regions of the duct; and determining the estimate of the region containing the failure event based on a spatial relationship between the preliminary estimate of the region containing the failure event, the acoustic weighted position, and the positions of the plurality of microphones.

The method may further comprise: discretising the first sub-volume of the duct into a three-dimensional grid comprising a plurality of voxels according to a first grid mesh size; and determining a first estimate of a location of the failure event using a time domain beamforming algorithm applied to the first sub-volume of the duct and the plurality of acoustic signals, wherein the algorithm is configured to, for each voxel of the first sub-volume, combine the plurality of acoustic signals based on the position of the respective microphone relative to a position of the voxel, and determine a first estimate of the location of the failure event based on the combination of the plurality of acoustic signals.

Determining the first estimate of the location of failure based on the combination of the plurality of acoustic signals may comprise: determining a spatial energy map from the combination of a spatial response of the plurality of acoustic signals; and determining the first estimate of the location of failure as a position corresponding to a maximum energy in the spatial energy map.

The method may further comprise determining a second estimate of the location of the failure event, comprising: reducing the first sub-volume of the duct to a second sub-volume of the duct based on the first estimate of the location of the failure event; discretising the second sub-volume into a three-dimensional grid comprising a plurality of voxels according to a second grid mesh size, wherein the second grid mesh size is smaller than the first grid mesh size; and determining the second estimate of the location of the failure event using the time domain beamforming algorithm applied to the plurality of acoustic signals and the second sub-volume of the duct.

The method may further comprise comparing the first estimate of the location of the failure event and the second estimate of the location of the failure event according to a convergence criteria; and iteratively determining a further estimate of the location of the failure event based on the comparison.

According to a second aspect, there is provided a system for detecting a failure event in a pressurised fluid duct, comprising: a plurality of microphones configured to record sound waves in an environment of the pressurised fluid duct to produce a plurality of acoustic signals, wherein each microphone of the plurality of microphones is located at a predetermined position relative to the duct; and processor circuitry coupled to the plurality of microphones, the processor circuitry configured to execute instructions comprising a method according to the first aspect.

According to a third aspect, there is provided a computer-implemented method comprising steps corresponding to a method according to the first aspect.

According to a fourth aspect, there is provided a non-transitory computer readable storage medium storing instructions that, when executed by a processor, causes the processor to perform a method according to the first aspect.

According to a fifth aspect, there is provided an apparatus comprising processor circuitry configured to execute instructions comprising a method according to the first aspect.

According to a sixth aspect, there is provided a method of determining a location of a failure event in a pressurised fluid duct, comprising: monitoring a plurality of acoustic signals, each acoustic signal of the plurality of acoustic signals corresponding to a recording of sound waves by a respective microphone in an environment of the duct, wherein each microphone is located at a predetermined position relative to the duct; detecting that a failure event in the duct has occurred based on an acoustic signal of the plurality of acoustic signals exceeding a first failure threshold, and identifying a failure marker as a time at which the failure event is detected; estimating, for each acoustic signal of the plurality of acoustic signals, a failure detection time based on the failure marker and a rate of change in sound pressure level for each acoustic signal; determining an acoustic weighted position for the plurality of acoustic sensors based on the respective failure detection time for each acoustic signal and the position of each microphone; determining an estimate of a region containing the failure event as a first sub-volume of the duct based on the acoustic weighted position and a predetermined relationship between sound pressure level and regions of the duct; discretising the first sub-volume of the duct into a first three-dimensional grid comprising a plurality of voxels according to a first grid mesh size; and determining a first estimate of the location of the failure event using a time-domain beamforming algorithm applied to the plurality of acoustic signals and the first sub-volume of the duct, wherein the algorithm is configured to, for each voxel of the first sub-volume, combine the plurality of acoustic signals based on the position of the respective microphone relative to a position of the voxel, and determine the first estimate of the location of failure based on the combination of the plurality of acoustic signals.

Determining the first estimate of the location of failure based on the combination of the plurality of acoustic signals may comprise: determining a spatial energy map from the combination of a spatial response of the plurality of acoustic signals; and determining the first estimate of the location of failure as a position corresponding to a maximum energy in the spatial energy map.

The method may further comprise determining a second estimate of the location of failure, comprising: reducing the first sub-volume to a second sub-volume of the duct based on the first estimate of the location of failure; discretising the second sub-volume into a second three-dimensional grid comprising a plurality of voxels according to a second grid mesh size, wherein the second grid mesh size is smaller than the first grid mesh size; and determining the second estimate of the location of failure using the time-domain beamforming algorithm applied to the plurality of acoustic signals and the second sub-volume of the duct.

The method may further comprise comparing the first estimate of the location of the failure event and the second estimate of the location of the failure event according to a convergence criteria; and iteratively determining a further estimate of the location of the failure event based on the comparison.

The first failure threshold may be based on historical characteristics of failure events in a pressurised fluid duct.

Estimating the failure detection time may comprise identifying a sample of the acoustic signal around the failure marker; calculating a root-mean-square (RMS) pressure signal of the sample and determining a rate of change in the RMS pressure signal; and identifying the failure detection time as a time of occurrence of a peak of the rate of change in the RMS pressure signal which exceeds a second failure threshold.

The second failure threshold may be a predetermined threshold for RMS pressure based on empirical characteristics of failure in pressurised fluid ducts.

Determining the acoustic weighted position may comprise: assigning an acoustic weight to each microphone based on a comparison between the respective failure detection time for the respective acoustic signal and an earliest failure detection time of the plurality of acoustic signals; and calculating the acoustic weighted position as a weighted average of the respective positions of the plurality of microphones, wherein the respective acoustic weight of each microphone is used to calculate the weighted average.

The predetermined relationship between sound pressure level and regions of the duct may comprise an empirical relationship describing a variation in time taken for sound pressure level to change from a first level to a second level based on a region of the duct.

Determining the estimate of a region containing the failure event as a first sub-volume of the duct may comprise: determining a preliminary estimate of the region containing the failure event based on the predetermined relationship between sound pressure level and regions of the duct; and determining the estimate of the region containing the failure event based on a spatial relationship between the preliminary estimate of the region containing the failure event, the acoustic weighted position, and the positions of the plurality of microphones.

The method may further comprise: calculating, for each acoustic signal of the plurality of acoustic signals, one or more spectral characteristics; and determining at least one failure characteristic of the failure event based on a comparison between the one or more spectral characteristics, the estimate of the region containing the failure event, and one or more predefined failure event parameters.

The at least one failure characteristic may comprise at least one of a burst aperture area and a Mach number.

The one or more predefined failure event parameters may comprise: one or more empirical relationships relating to a time taken for a microphone to measure a predefined sound pressure level in a pressurised fluid duct.

Determining at least one failure characteristic of the failure event may be based on a comparison between the one or more spectral characteristics, the estimate of the region containing the failure event, the one or more predefined failure event parameters, and one or more RMS pressure characteristics based on the RMS pressure signal.

According to a seventh aspect, there is provided a system for detecting a failure event in a pressurised fluid duct, comprising: a plurality of microphones configured to record sound waves in an environment of the pressurised fluid duct to produce a plurality of acoustic signals, wherein each microphone of the plurality of microphones is located at a predetermined position relative to the duct; and processor circuitry coupled to the plurality of microphones, the processor circuitry configured to execute instructions comprising a method according to the sixth aspect.

According to an eighth aspect, there is provided a computer-implemented method comprising steps corresponding to a method according to the sixth aspect.

According to a ninth aspect, there is provided a non-transitory computer readable storage medium storing instructions that, when executed by a processor, causes the processor to perform a method according to the sixth aspect.

According to a tenth aspect, there is provided an apparatus comprising processor circuitry configured to execute instructions comprising a method according to the sixth aspect.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION

Figure 1:
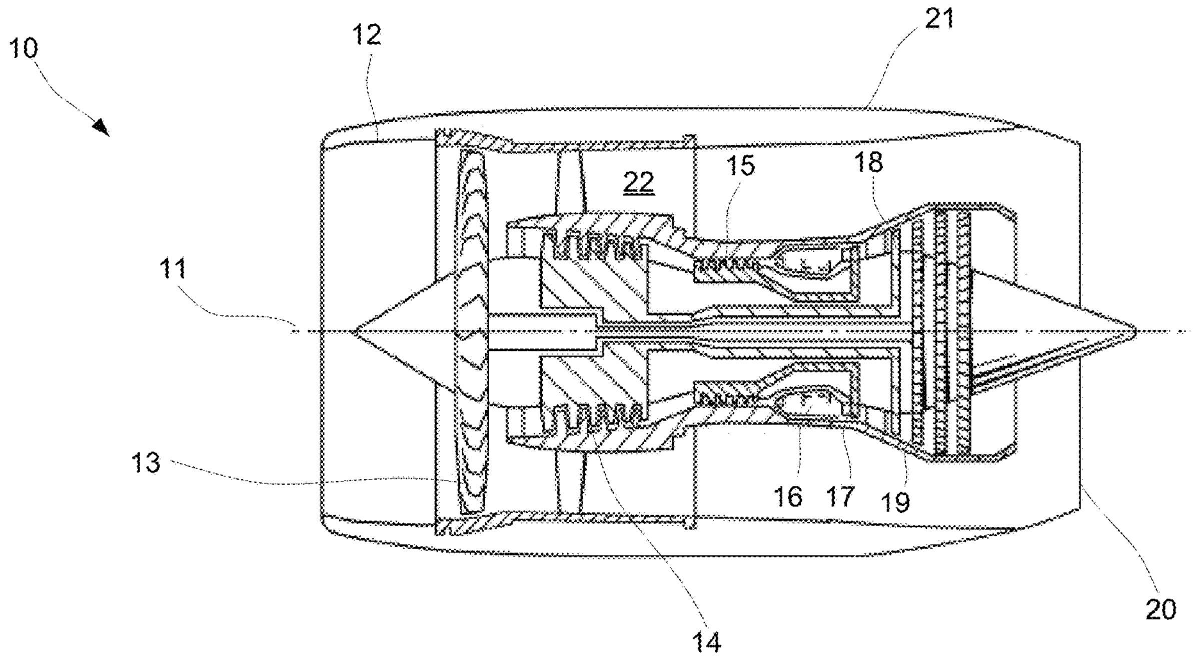
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Gas turbine engines may include one or more pressurised fluid ducts. A pressurised fluid duct is herein used to refer to a duct that is configured to carry a fluid under positive pressure. For example, gas turbine engines may include a cooling system which uses one or more cooling air ducts for providing a supply of cooling air to the turbines. In such an example, the cooling air duct forms a pressurised fluid duct.

Figure 2:
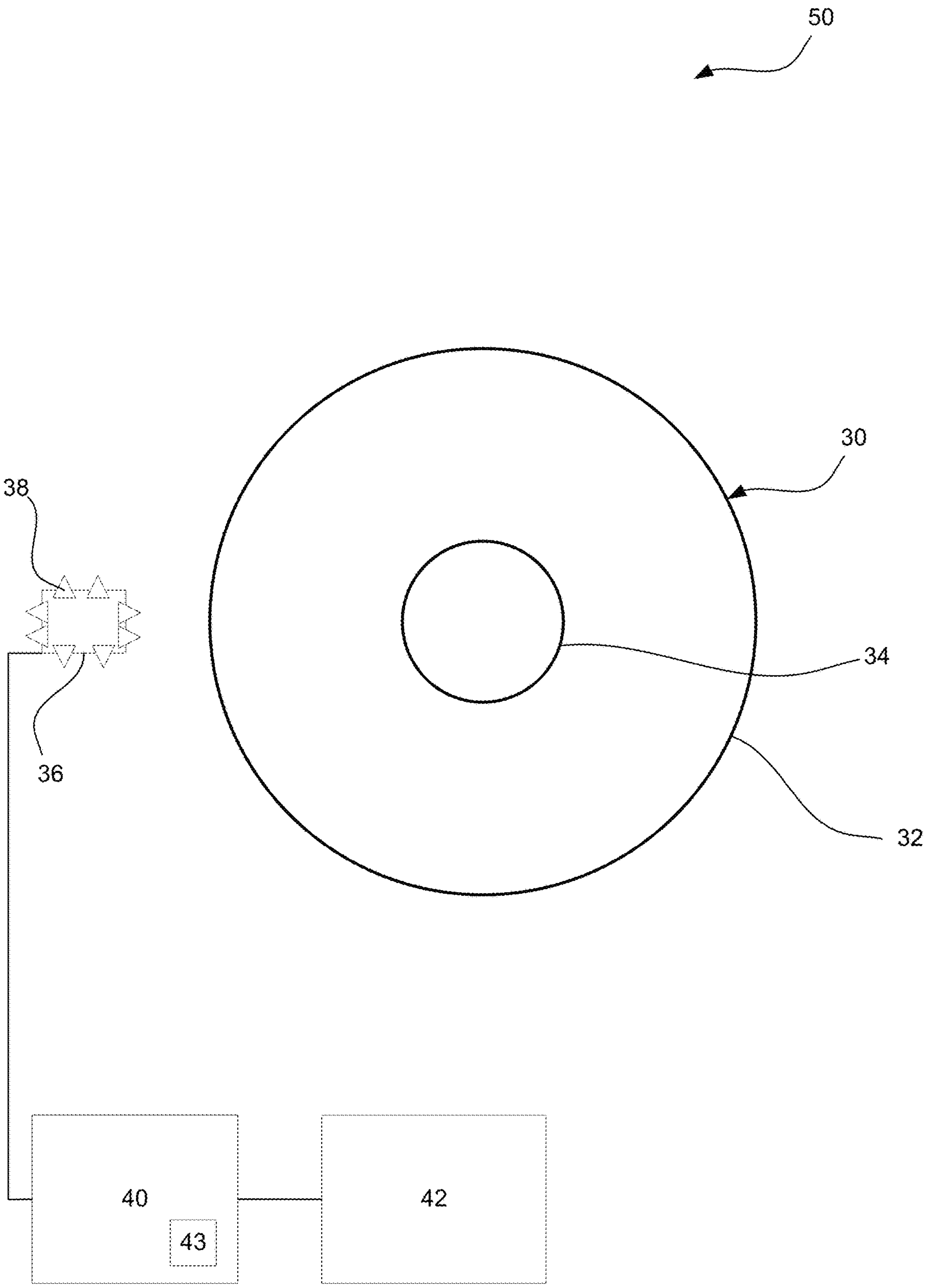
FIG. 2 is a schematic view of an example system for detecting a failure event in a pressurised fluid duct according to the present disclosure.

FIG. 2 shows an example system 50 for detecting a failure event in a pressurised fluid duct 30. The system 50 comprises a pressurised fluid duct 30, a sensor unit 36, a memory module 40, and a processor 42. The processor 42 may comprise one or more processors suitable for the execution of a computer program including, by way of example, both general and special purpose microprocessors, and any one or more processors of any kind of digital computer. The memory module 40 may comprise any memory device suitable for storing instructions and data. The memory module 40 may comprise one or more mass storage devices for storing data, e.g., magnetic, magneto optical disks, or optical disks. The memory module 40 may be a computer readable media suitable for storing computer readable instructions 43 and data, including all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor 42 and the memory module 40 can be supplemented by, or incorporated in, special purpose logic circuitry. The memory module 40 stores the computer readable instructions 43 that, when executed by the processor 42, enables the processor 42 to perform the methods described herein, including the methods described with reference to FIGS. 4 and 5 below.

The duct 30 comprises an outer wall 32 and an inner wall 34. Both the outer wall 32 and the inner wall are cylindrical, such that the duct 30 has an annular cross-section. In other examples, the duct may have any other shaped cross-section. The sensor unit 36 comprises a plurality of microphones 38 arranged as a microphone array. The microphones 38 are configured to detect sound waves. The microphones 38 may comprise any type of microphone, for example condenser microphones, fibre-optic microphones, piezoelectric microphones, dynamic microphones, carbon microphones, or ribbon microphones. The sensor unit 36 is located at a predetermined position relative to the duct 30, such that each of the microphones 38 are also located at a predetermined position relative to the duct 30. The sensor unit 36 is located at a position external to the duct 30. In other examples, the sensor unit 36 may be located within the duct 30.

The microphones 38 are configured to continuously measure sound waves in the environment of the duct and convert the sound waves into acoustic signals. Each microphone 38 is configured to measure a respective acoustic signal. Each acoustic signal is representative of the sound pressure level over time. The measured acoustic signals are recorded in the memory module 40. The measured acoustic signals may be recorded in the memory module 40 by the processor 42. The processor 42 is configured to receive the measured acoustic signals from the memory module 40 and process the acoustic signals.

The processor 42 is configured to continuously analyse each of the acoustic signals to detect a failure event in the duct 30. In particular, when one of the acoustic signals exceeds a first failure threshold, a failure event is detected. For example, a failure event is detected when the sound pressure level exceeds a sound pressure level defined by a first failure threshold. The first failure threshold is a predetermined threshold based on historical characteristics of failure events in a pressurised fluid duct. For example, sound pressure levels measured during failure in similar pressurised fluid ducts can enable a threshold sound pressure level to be determined which represents a failure threshold. The first failure threshold may also be determined based on experimental data relating to failure in pressurised fluid ducts. The first failure threshold may also be defined as a sound pressure level gradient over time. The first failure threshold may be defined as a point value or as a range of values. In addition, the failure threshold can account for typical background noise present in the environment around the duct 30. For example, for a duct 30 located in a gas turbine engine cavity, experimental data can be used to determine the typical background noise that may be present for such a duct 30 at different operating conditions of the gas turbine engine. The background noise can be accounted for in the first failure threshold by defining a signal-to-noise ratio which is representative for a typical failure in the duct.

Once a failure event is detected in one of the acoustic signals, the time at which the failure event is detected is identified as a failure marker. The processor 42 is configured to, for each microphone 38, sample a portion of the respective acoustic signal recorded by the microphone 38 around the time defined by the failure marker. For example, the processor 42 may be configured to sample a period of 5 seconds around the failure marker, such that at least 2 seconds before the failure marker and at least 2 seconds after the failure marker are captured in the sample. In other examples, the processor 42 may be configured to sample different periods of time around the failure marker.

The processor 42 is configured to analyse the sample of each acoustic signal to estimate a respective failure detection time for the acoustic signal as measured by the respective microphone 38. The failure detection time is defined as the time at which the respective microphone 38 detects the failure event. The processor 42 is configured to calculate the root-mean-square (RMS) pressure signal of the sample of each acoustic signal. The RMS pressure is the square root of the average of the square of the sound pressure level of the acoustic signal over the time period of the sample. The RMS pressure is related to the energy carried by the acoustic signal. The variation in the RMS pressure over time is used to estimate the failure detection time. This may be done in two stages, first involving a coarse estimation of the failure detection time and then a fine estimation of the failure detection time. The coarse estimation of the failure detection time is determined by analysing the variation of the RMS pressure over time to find a specific time period in which the failure is likely to have been detected. This may be indicated by a sudden peak or spike in the RMS pressure signal over time. The fine estimation of the failure detection time is determined by identifying the time of occurrence of a first peak in the specific time period of the RMS pressure signal that exceeds a second failure threshold. The second failure threshold is a predetermined threshold for RMS pressure based on empirical characteristics of failure in pressurised fluid ducts. For instance, the second failure threshold is set based on known levels of RMS pressure which characterise a failure in a pressurised fluid duct which is under similar conditions. The time at which this first peak above the second failure threshold occurs is identified as the failure detection time for the respective acoustic signal and the respective microphone 38.

Figure 3:
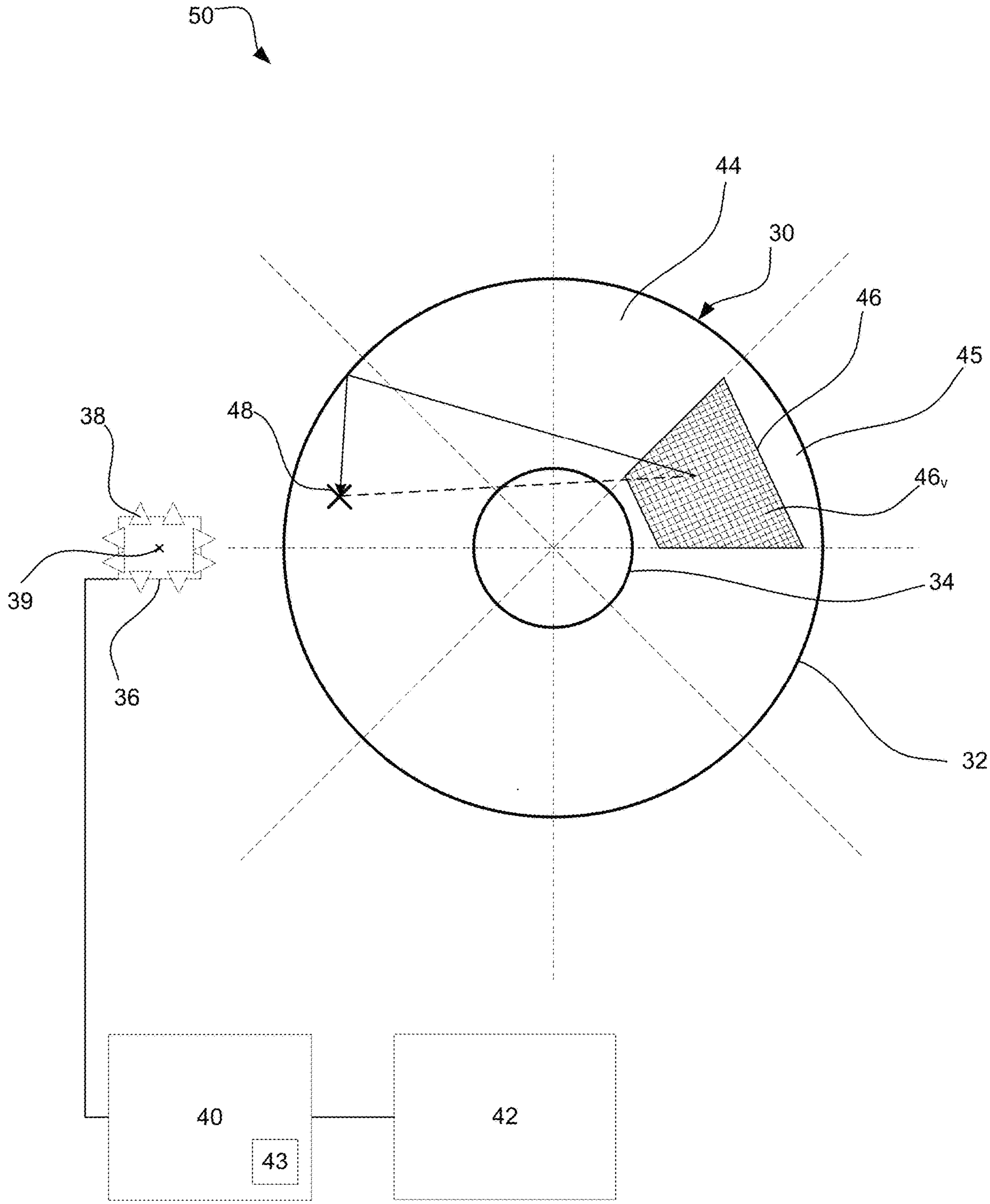
FIG. 3 is a schematic view of the example system of FIG. 2, highlighting a region of the pressurised fluid duct.

Referring now to FIG. 3, the processor 42 is then configured to determine an acoustic weighted position 48 for the plurality of microphones based on the respective failure detection time for each acoustic signal and the position of each microphone 38.

The acoustic weighted position 48 relates to a weighted average of the positions of the plurality of microphones 38, where the weights are set based on the respective failure detection time for each microphone 38. Each microphone 38 is assigned an acoustic weight between a value of 0 and 1, where a value of 1 is assigned to the first microphone 38 which detects the failure event (i.e., the microphone 38 having the earliest failure detection time), and a value of 0 is assigned to the last microphone 38 which detects the failure event (i.e., the microphone 38 having the latest failure detection time). The acoustic weighted position 48 is determined using the following equation:

$$\vec{A}_w = \frac{\sum_{i=1}^{N} w_i \cdot \vec{x_i}}{\sum_{i=1}^{N} w_i} \quad (1)$$

where $\vec{A}_w$ is the acoustic weighted position 48, $w_i$ is the acoustic weight assigned to each microphone, N is the number of microphones, and $\vec{x}_i$ is the vector position of each microphone. The vector position of each microphone is defined relative to a datum point. The datum point may be located in or on the duct.

The acoustic weighted position 48 is used to determine an estimate of a region of the duct containing the failure event. In particular, the processor 42 is configured to determine an estimate of a region of failure as a first sub-volume of the duct based on the acoustic weighted position 48 and a predetermined relationship between sound pressure level and duct region. The acoustic weighted position 48 is first used to estimate a direction of arrival at the sensor module of a sound wave which originates from the location of the failure event. The collection of all possible directions of arrival of the sound wave at the sensor module 36 can be considered as forming a hemisphere around the sensor module 36, with the sensor module 36 forming the centre point of the hemisphere. The acoustic weighted position 44 defines a point in space which lies on the surface of this hemisphere. A line extending from the centre point 39 to the acoustic weighted position 48 forms an estimate of a direction of arrival of the sound wave at the sensor module 36.

The duct 30 can be considered as being divided into a plurality of angular sectors 44. In the example shown in FIG. 3, the duct 30 is considered to be divided into eight angular sectors, where the centre of each angular sector is angularly spaced from an adjacent angular sector by 45 degrees. In other examples, the duct may be divided into another number of angular sectors, or into any number of discrete regions. A predetermined relationship between sound pressure level and duct region is used to estimate a region of the duct containing the failure event. The predetermined relationship is based on experimental data which explains how the time taken for the sound pressure level measured by a microphone 38 to change from a first level to a second level varies according to the angular sector 44 of the duct 30 which contains the location of the failure event. For example, the predetermined relationship may show that the time taken for the sound pressure level detected by the microphone 38 to change from 80 dB to 90 dB depends upon which angular sector 44 contains the true location of the failure event. The processor 42 is configured to analyse the acoustic signal recorded for each microphone 38 and compare it with the predetermined relationship to determine an estimate of the angular sector 45 of the duct 30 which contains the location of the failure event.

The processor 42 is then configured to determine a sub-volume 46 of the duct 30 based on a spatial relationship between the estimate of the angular sector 45 of the duct 30, the acoustic weighted position 48, and the positions of the microphones 38. In particular, the sub-volume 46 of the duct 30 is located at least partially within the estimate of the angular sector 45 of the duct. The processor 45 is configured to intersect a cone extending between a centre point 39 of the sensor module 36 (which is a centre point of the plurality of microphones 38 of the sensor module 36) and the estimated angular sector 45 of the duct 30. The cone has an axis defined as a line passing through the centre point 39 of the sensor module 36 and the acoustic weighted position 48, such that the apex of the cone lies at the centre point 39 of the sensor module 36. In examples, the cone may have an aperture angle of 60°. In other examples, the aperture angle may be any angle between 30-60°. At least part of the volume of the cone intersects with at least part of the volume of the estimated angular sector 45. The part of the volume of the estimated angular sector 45 which intersects with the volume of the cone is defined as a first sub-volume 46 of the duct 30 estimated to contain the location of the failure event.

The processor 42 is configured to discretise the first sub-volume 46 of the duct into a regularly spaced three-dimensional grid, such that the first sub-volume comprises a plurality of voxels 46*v*. A voxel is a cubic volume unit of the first sub-volume. The grid has a first grid mesh size, defined by the length of each voxel 46*v*. The mesh size of the grid can be varied according to accuracy and computation time, in that a smaller mesh size may provide increased accuracy but lead to an increased computation time, whereas a larger mesh size may have reduced accuracy but have a shorter computation time. In examples, the mesh size of the grid may be 100 mm. This mesh size provides a balance between accuracy and computation time.

The processor 42 is configured to establish a line of sight between each voxel 46*y* and the acoustic weighted position 48. A clear line of sight is established when no obstacles exist in a straight line extending between the centre point of a voxel 46*v* and the acoustic weighted position 48. A line of sight cannot be established when an obstacle or obstruction exists between the centre point of a voxel 46*v* and acoustic weighted position 48. When a line of sight cannot be established for a voxel 46*v*, the processor 42 is configured to apply a ray-tracing technique. The ray-tracing technique can be used to determine a trajectory of an acoustic wave that connects the particular voxel 46*v* to the acoustic weighted position 48.

The processor 42 is configured to apply a time-domain beamforming algorithm to the first sub-volume 46 of the duct and the plurality of acoustic signals in order to determine a first estimate of the location of the failure event. In particular, the time-domain beamforming algorithm which is used is a Steered Sample Algorithm. The algorithm is configured to, for each voxel 46*v* of the first sub-volume 46 of the duct 30, combine the plurality of acoustic signals based on the position of the respective microphone 38 relative to a position of the voxel 46*v*, and determine a first estimate of the location of the failure event based on the combination of the plurality of acoustic signals. The algorithm considers sampling the acoustic signals based on a spatial location. A time domain sampling process can be described as:

$$f(t_s) = \int_{-\infty}^{+\infty} f(t)\delta(t - t_s)dt \quad (2)$$

where $t_s$ is the sampling time and $f(t_s)$ is the sampled signal of f(t). In the steered sample algorithm, sampling time is correlated with spatial location, instead of being equally spaced. This transforms Eqn. 2 into:

$$g(x) = f(t_s(x)) = \int_{-\infty}^{+\infty} f(t)\delta(t - t_s(x))dt \quad (3)$$

where $t_s(x)$ is the sampling time as a function of spatial location. Samples of the signals which are sampled as a function of spatial position are known as steered samples. The steered samples of all collected signals can be used to form a spatial energy map, described by:

$$P(x) = \sum_{n\in\mathbb{Z}} g_n(x) = \sum_{n\in\mathbb{Z}} \int_{-\infty}^{+\infty} f_n(t)\delta(t - t_n(x))dt \tag{4}$$

where $t_n(x)$ and $g_n(x)$ are steered sample times and steered samples, respectively. The maximum energy of the spatial energy map corresponds to the acoustic source, which in this case is the failure event in the duct. The position corresponding to the maximum of P (z) therefore corresponds to the position of the acoustic source.

The steered sampling time $t_n(x)$ for the acoustic source location is defined as:

$$t_n(x) = \frac{|x - x_n|}{v} \tag{5}$$

where $x_n=[x_n, y_n, z_n]^T$ which is the nth microphone position, $|x-x_n|$ is the distance from the source to the nth microphone, and vis the velocity. Eqn. 4 then becomes:

$$P(x) = \sum_{n\in\mathbb{Z}} \int_{-\infty}^{+\infty} f_n(t)\delta\left(t - \frac{|x - x_n|}{v}\right)dt \tag{6}$$

At a certain sampling time $t_1$, sample $f_n(t_1)$ of the acoustic signal is distributed in the spatial domain on a circumference with the nth microphone position as the centre of the circle and $t_1v$ as the radius of the circle. The samples of the entire acoustic signal are distributed on a concentric circle with the nth microphone position as the centre and tv as the radius of the circle. The combination of the spatial response of all of the acoustic signals results in a spatial energy map and the position of maximum energy is the acoustic source position i.e., the location of the failure event.

The steered sample algorithm is applied to each voxel 46$_v$ of the first sub-volume 46, based on the acoustic signals acquired by the plurality of microphones 38. This is done by discretising Eqn. 6:

$$P(x) = \sum_{n\in\mathbb{Z}} \sum_{m\in\mathbb{Z}} f_n(t_m)\delta\left(t_m - \frac{|x - x_n|}{v}\right) \tag{7}$$

where $t_m$ is the discrete sampling time. If the first sub-volume 46 has a grid with a mesh size designated by $n_x \times m_y \times l_z$, Eqn. 7 is expressed as:

$$P(k\Delta x) = \sum_{n\in\mathbb{Z}} \sum_{m\in\mathbb{Z}} f_n(t_m)\delta(t_m - t_n(k\Delta x)) \tag{8}$$

where $k=(n_x, m_y, l_z)$, and $\Delta x=(\Delta x, \Delta y, \Delta z)$ which is the step size of the grid. The microphones may record acoustic signals at a sampling time which does not exactly correspond to the steered sampling time $t_n(k\Delta x)$. Interpolation is therefore used to compute the steered sample in numerical terms. For example, linear interpolation or neighbourhood interpolation may be used. In other examples, a Gaussian function may be implemented to avoid interpolation in computing the steered sample.

For the first sub-volume 46 of the duct 30, the voxel 46$_v$ which produces the maximum energy value from the steered sample algorithm is considered to be a first estimate of the location of the failure event in the duct 30. The processor 42 is subsequently configured to refine the first sub-volume 46 by identifying a second sub-volume of the duct which is within the first sub-volume 46, where the second sub-volume is centred around the first estimate of the location of the failure event. The second sub-volume is smaller than the first sub-volume 46. The second sub-volume is defined as a cube.

For example, if the first sub-volume has a grid mesh size of 100 mm, the second sub-volume may be a cube of size 300 mm. The processor is configured to divide the second sub-volume into a second three-dimensional grid, defining a plurality of voxels according to a second grid mesh size. The second grid mesh size is smaller than the grid mesh size of the grid of the first sub-volume. For example, if the first sub-volume has a grid with a mesh size of 100 mm, the second sub-volume may have a grid with a mesh size of 10 mm. In this example, the second sub-volume has a grid with a mesh size $1/10^{th}$ of the mesh size of the grid of the first sub-volume. In other examples, other mesh sizes could be used.

The steered sample algorithm is applied to the second sub-volume of the duct 30. The voxel position in the second sub-volume which returns the maximum energy value from the steered sample algorithm is considered to be a second estimate of the location of failure in the duct. If the second estimate of the location of failure differs from the first estimate of the location of failure by an amount which is according to or which is less than that required by a convergence criteria, the process stops and the second estimate is determined to be the location of failure in the duct. However, if the second estimate of the location of failure differs from the first estimate of the location of failure by more than that required by the convergence criteria, the process continues iteratively by defining a next sub-volume of the duct within the previous sub-volume of the duct, applying the steered sample algorithm to the next sub-volume of the duct to determine a next estimate of the location of the failure event. The next sub-volume of the duct is centred around the second estimate of the location of the failure event. The next sub-volume of the duct is smaller in size than the second sub-volume and is discretised into a three-dimensional grid of voxels in a mesh size which is smaller than the mesh size of the grid of the second sub-volume. This process continues iteratively until the convergence criteria is satisfied. The convergence criteria may specify that the current estimate of the location of failure differs from the previous estimate of the location of failure by an amount less than in the order of 10.3. In other examples, the convergence criteria may specify that the current estimate of the location of failure differs from the previous estimate of the location of failure by an amount less than in the order of 10-2.

The processor 42 is also configured to characterise the failure event in the pressurised fluid duct 30. Characterising the failure event includes determining one or more characteristics which describe the severity of the failure event. The processor 42 is configured to calculate spectral characteristics of the acoustic signal recorded by each microphone 38 of the plurality of microphones 38. The spectral characteristics are calculated by performing a Fourier transform on the acoustic signal, converting the signal from the time domain into the frequency domain. In particular, the processor 42 is configured to perform a Fast Fourier Transform (FFT) on the acoustic signal. The portion of the acoustic signal on which the FFT is performed may be the sample of the acoustic signal which is taken around the failure marker. As described above, the processor 42 may be configured to sample a period of 5 seconds of the acoustic signal around the failure marker, such that at least 2 seconds of the acoustic signal before the failure marker and at least 2 seconds of the acoustic signal after the failure marker are captured in the sample. In other examples, the processor 42 may be configured to sample different periods of time around the failure marker. The FFT produces the spectral characteristics of the acoustic signal as individual frequency components of the signal. The spectral characteristics indicate which frequencies are dominant in the acoustic signal.

The processor 42 is configured to determine at least one failure characteristic of the failure event based on the spectral characteristics of each acoustic signal, the estimate of the region of the duct containing the failure event, and one or more predefined failure parameters. The processor 42 may also be configured to determine the at least one failure characteristic of the failure event based on one or more RMS pressure characteristics of the acoustic signals, in conjunction with the aforementioned inputs. The estimate of the region of failure of the duct containing the failure event can correspond to the estimate of the angular sector of the duct which contains the location of the failure event, and/or the first sub-volume of the duct. The one or more predefined failure parameters relate to known characteristics of failure in pressurised fluid ducts. For example, the one or more predefined failure parameters can include one or more empirical relationships relating to a time taken for a microphone to measure a predefined sound pressure level in a pressurised fluid duct. The known relationship can be based on experimental data which describes how the time taken for the sound pressure level measured by a microphone 38 to change from a first level to a second level varies according to a severity of failure, for example according to whether a large rupture or burst is present in the duct or whether a smaller burst or leak is present in the duct. For example, the known relationship may show that the time taken for the sound pressure level detected by a microphone to change from 80 dB to 90 dB depends upon which the severity of the failure. The one or more predefined failure parameters may also include one or more frequency profiles indicative of different levels of severity of failure in a pressurised fluid duct. The frequency profiles may have been obtained by performing FFTs on acoustic signals obtained in experiments investigating failure in pressurised fluid ducts. The frequency profiles can indicate which frequencies are dominant according to varying levels of severity of failure. The RMS pressure characteristics correspond to the RMS pressure calculated for the sample of each acoustic signal. The RMS pressure characteristics can include an RMS pressure level for the sample, a rate of change of the RMS pressure, and/or peak values of the RMS pressure.

The at least one failure characteristic may include a burst aperture area and/or a Mach number for fluid flow exiting the pressurised fluid duct as a result of the failure event. The burst aperture area relates to an area of an aperture created in the duct as a result of the failure event. The Mach number can indicate the velocity of the fluid flow exiting the pressurised fluid duct as a result of the failure event, providing an indication of the severity of the failure event.

The processor 42 is configured to determine the at least one failure characteristic based on any suitable correlation between the spectral characteristics of each acoustic signal, the estimate of the region of the duct containing the failure event, the one or more predefined failure parameters, and/or the one or more RMS pressure characteristics, and the at least one failure characteristic. For example, the processor may refer to a look-up table or database containing predetermined correlations. In the table or database, the spectral characteristics of each acoustic signal, the estimate of the region of the duct containing the failure event, the one or more predefined failure parameters, and/or the RMS pressure characteristics may correspond to predetermined values of the at least one failure characteristic. The predetermined values of the at least one failure characteristic may be determined from experimental data. The processor can look up the input data (i.e., the spectral characteristics of each acoustic signal, the estimate of the region of the duct, the one or more predefined failure parameters, and/or the RMS pressure characteristics) in the table or database to find the at least one failure characteristic which corresponds to the input data. The table or database may be set or updated, for example based on failure data collected during operation of the pressurised fluid duct, or to reflect changes to the profile or arrangement of the pressurised fluid duct.

In an alternative example, the processor may refer to a model which correlates the input data (i.e., the spectral characteristics of each acoustic signal, the estimate of the region of the duct containing the failure event, the one or more predefined failure parameters, and/or the RMS pressure characteristics) with the at least one failure characteristic. The model may be an artificial intelligence model, for example a linear regression model, a deep neural network or a decision tree. The model may be trained using experimental data or historical failure data for pressurised fluid ducts. The model may be updated based on updated real-life failure data and developments or changes in the profile or arrangement of the pressurised fluid duct.

Figure 4:
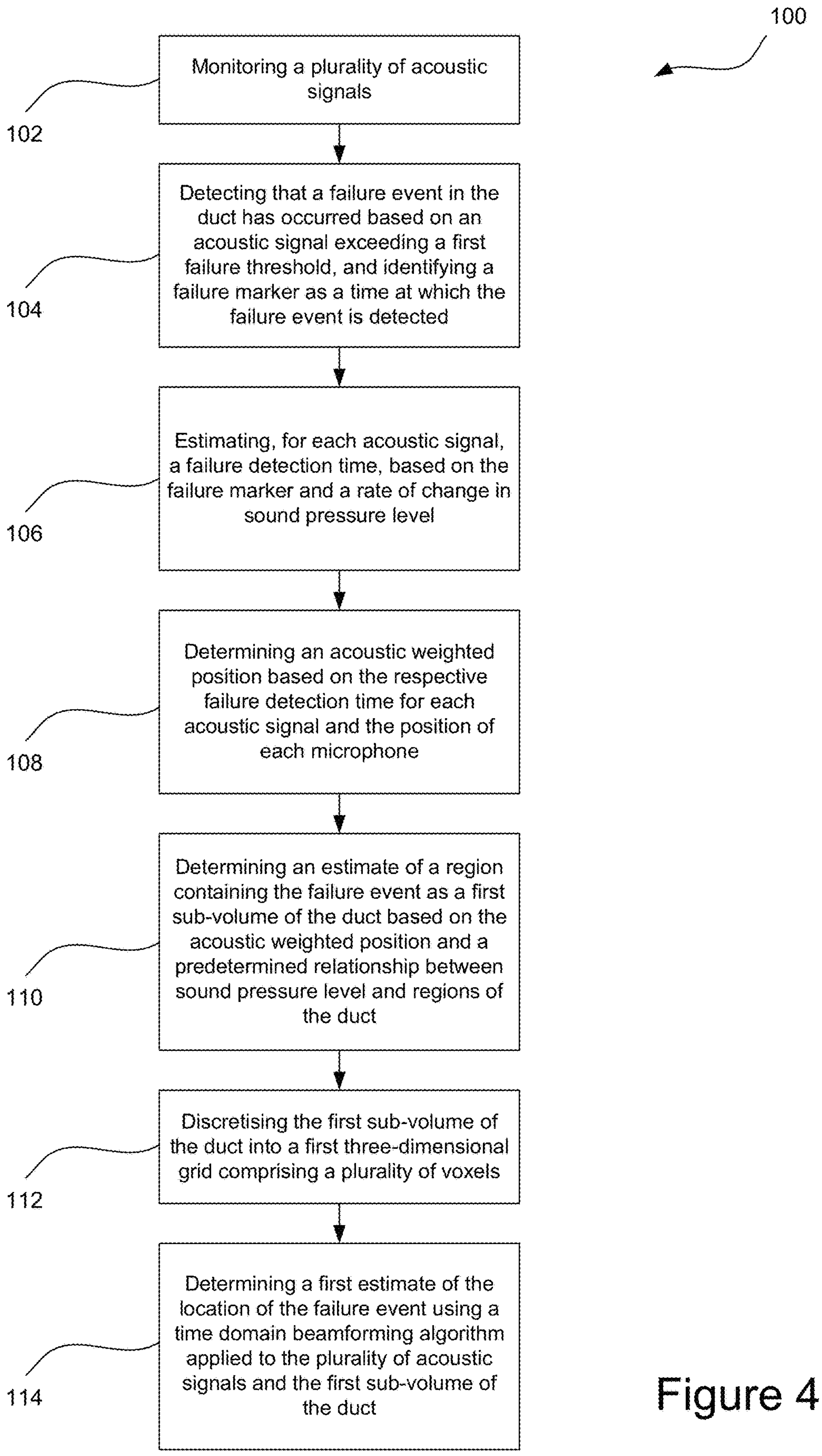
FIG. 4 is a flow diagram illustrating a method of determining a location of a failure event in a pressurised fluid duct.

FIG. 4 is a flow diagram illustrating a method 100 of determining a location of a failure event in a pressurised fluid duct, according to the present disclosure. At a first step 102, the method comprises monitoring a plurality of acoustic signals, each acoustic signal of the plurality of acoustic signals corresponding to a recording of sound waves by a respective microphone in an environment of the duct, wherein each microphone is located at a predetermined position relative to the duct. At a second step 104, the method comprises detecting that a failure event in the duct has occurred based on an acoustic signal of the plurality of acoustic signals exceeding a first failure threshold, and identifying a failure marker as a time at which the failure event is detected. At a third step 106, the method comprises estimating, for each acoustic signal of the plurality of acoustic signals, a failure detection time based on the failure marker and a rate of change in sound pressure level for each acoustic signal. At a fourth step 108, the method comprises determining an acoustic weighted position for the plurality of acoustic sensors based on the respective failure detection time for each acoustic signal and the position of each microphone. At a fifth step 110, the method comprises determining an estimate of a region containing the failure event as a first sub-volume of the duct based on the acoustic weighted position and a predetermined relationship between sound pressure level and regions of the duct. At a sixth step 112, the method comprises discretising the first sub-volume of the duct into a first three-dimensional grid comprising a plurality of voxels according to a first grid mesh size. At a seventh step 114, the method comprises determining a first estimate of the location of the failure event using a time-domain beamforming algorithm applied to the plurality of acoustic signals and the first sub-volume of the duct, wherein the algorithm is configured to, for each voxel of the first sub-volume, combine the plurality of acoustic signals based on the position of the respective microphone relative to a position of the voxel, and determine the first estimate of the location of failure based on the combination of the plurality of acoustic signals.

Figure 5:
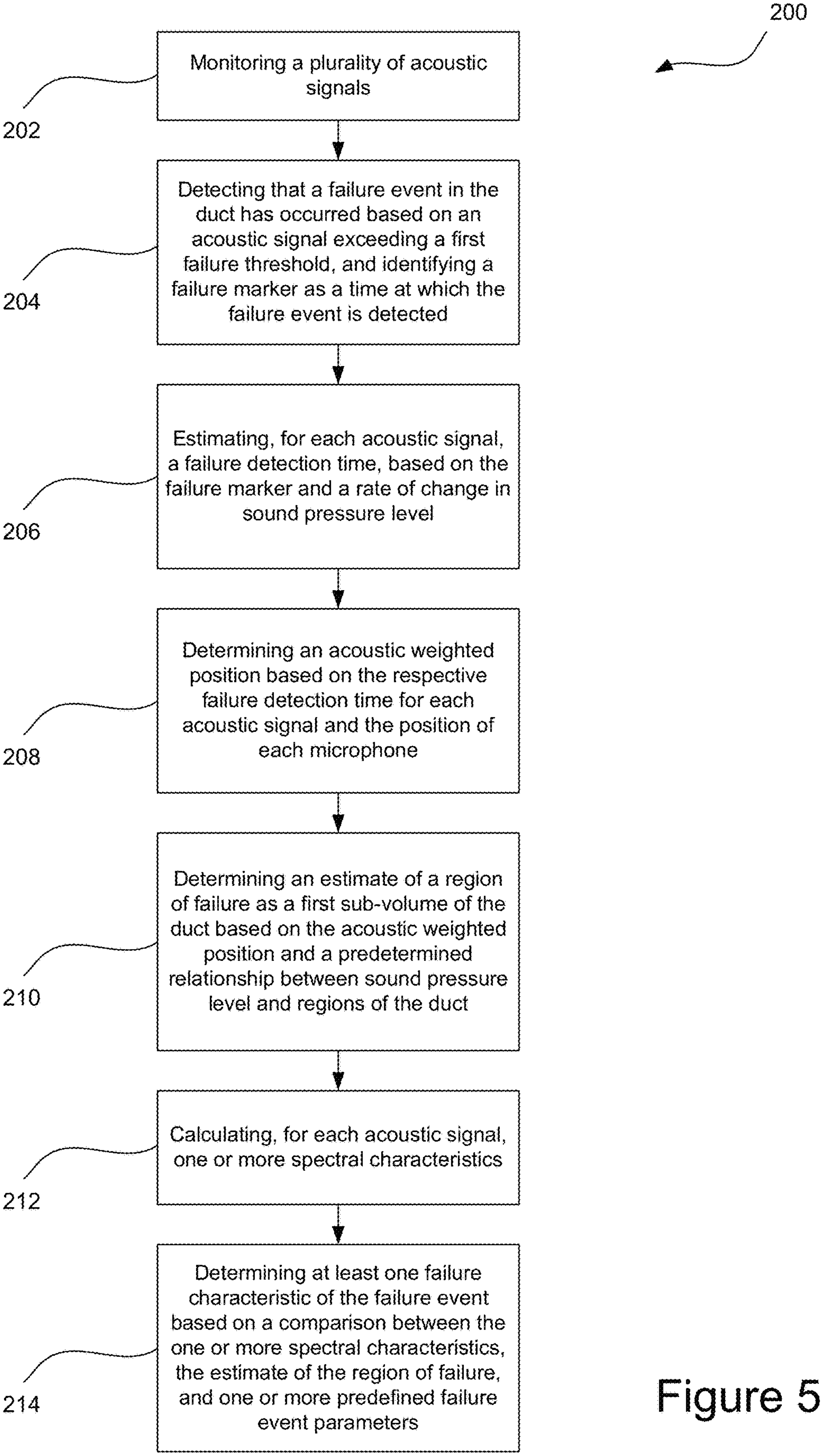
FIG. 5 is a flow diagram illustrating a method of characterising a failure event in a pressurised fluid duct.

FIG. 5 is a flow diagram illustrating a method 200 of characterising a failure event in a pressurised fluid duct, according to the present disclosure. At a first step 202, the method comprises monitoring a plurality of acoustic signals, each acoustic signal of the plurality of acoustic signals corresponding to a recording of sound waves by a respective microphone in an environment of the duct, wherein each microphone is located at a predetermined position relative to the duct. At a second step 204, the method comprises detecting that a failure event in the duct has occurred based on an acoustic signal of the plurality of acoustic signals exceeding a first failure threshold, and identifying a failure marker as a time at which the failure event is detected. At a third step 206, the method comprises estimating, for each acoustic signal of the plurality of acoustic signals, a failure detection time, based on the failure marker and a rate of change in sound pressure level for each acoustic signal. At a fourth step 208, the method comprises determining an acoustic weighted position for the plurality of acoustic sensors based on the respective failure detection time for each acoustic signal and the position of each microphone. At a fifth step 210, the method comprises determining an estimate of a region containing the failure event as a first sub-volume of the duct based on the acoustic weighted position and a predetermined relationship between sound pressure level and regions of the duct. At a sixth step 212, the method comprises calculating, for each acoustic signal of the plurality of acoustic signals, one or more spectral characteristics. At a seventh step 214, the method comprises determining at least one failure characteristic of the failure event based on a comparison between the one or more spectral characteristics, the estimate of the region containing the failure event, and one or more predefined failure event parameters.

It will be understood that the method 100 described with reference to FIG. 4 may be performed independently of the method 200 described with reference to FIG. 5. It will also be understood that the method 100 described with reference to FIG. 4 may be performed in conjunction with the method 200 described with reference to FIG. 5.

The methods and systems of the present disclosure enable a failure event in a pressurised fluid duct to be localised and characterised in a significantly faster manner than by use of temperature and pressure sensors. By analysing acoustic signals recorded by a plurality of microphones to detect a failure event, the likelihood of detecting a failure event in a pressurised fluid duct is increased, as compared to monitoring changes in temperature and pressure within the duct. The plurality of microphones can also be placed in more benign locations relative to the duct as compared to temperature and pressure sensors, which means that the data recorded by the microphones is less likely to be influenced by other events or operation of other components in a wider system containing the pressurised fluid duct. This means that failure events can be detected quickly and reliably, reducing the likelihood of causing additional damage to the pressurised fluid duct and/or surrounding components. The use of a time-domain beamforming algorithm for determining the location of a failure event enables the relevant portion of the duct to be discretised, such that all of the information in the recorded acoustic signal can be used to determine the location of the failure event. This algorithm provides improvement in accuracy over other methods, such as time-of-arrival methods, particularly in the presence of large temperature gradients, line-of-sight obstructions, or for non-stochastic acoustic signals. By analysing acoustic signals recorded by the plurality of microphones to form the basis for determining failure characteristics of the failure event, the nature and severity of the failure event can also be determined quickly and reliably, enabling appropriate mitigation actions to be taken promptly.

Although in the above examples the pressurised fluid duct has been described as being part of a gas turbine engine system, it will be appreciated that in other examples, the pressurised fluid duct may be one which may be part of any contained system.

Various implementations of the systems and methods described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method of characterizing a failure event in a pressurized fluid duct, comprising: monitoring a plurality of acoustic signals, each acoustic signal of the plurality of acoustic signals corresponding to a recording of sound waves by a respective microphone in an environment of the duct, wherein each microphone is located at a predetermined position relative to the duct; detecting that a failure event in the duct has occurred based on an acoustic signal of the plurality of acoustic signals exceeding a first failure threshold, and identifying a failure marker as a time at which the failure event is detected; estimating, for each acoustic signal of the plurality of acoustic signals, a failure detection time, based on the failure marker and a rate of change in sound pressure level for each acoustic signal; determining an acoustic weighted position for the plurality of acoustic sensors based on the respective failure detection time for each acoustic signal and the position of each microphone; determining an estimate of a region containing the failure event as a first sub-volume of the duct based on the acoustic weighted position and a predetermined relationship between sound pressure level and regions of the duct; calculating, for each acoustic signal of the plurality of acoustic signals, one or more spectral characteristics; and determining at least one failure characteristic of the failure event based on a comparison between the one or more spectral characteristics, the estimate of the region containing the failure event, and one or more predefined failure event parameters.

2. A method as claimed in claim 1, wherein the at least one failure characteristic comprises at least one of a burst aperture area and a Mach number.

3. A method as claimed in claim 1, wherein the one or more predefined failure event parameters comprises: one or more empirical relationships relating to a time taken for a microphone to measure a predefined sound pressure level in a pressurized fluid duct.

4. A method as claimed in claim 1, wherein the first failure threshold is based on historical characteristics of failure events in a pressurized fluid duct.

5. A method as claimed in claim 1, wherein estimating the failure detection time comprises identifying a sample of the acoustic signal around the failure marker; calculating a root-mean-square (RMS) pressure signal of the sample and determining a rate of change in the RMS pressure signal; and identifying the failure detection time as a time of occurrence of a peak of the rate of change of RMS pressure which exceeds a second failure threshold.

6. A method as claimed in claim 5, wherein the second failure threshold is a predetermined threshold for RMS pressure based on empirical characteristics of failure in pressurized fluid ducts.

7. A method as claimed in claim 5, wherein determining at least one failure characteristic of the failure event is based on a comparison between the one or more spectral characteristics, the estimate of the region containing the failure event, the one or more predefined failure event parameters, and one or more RMS pressure characteristics based on the RMS pressure signal.

8. A method as claimed in claim 1, wherein determining the acoustic weighted position comprises: assigning an acoustic weight to each microphone based on a comparison between the respective failure detection time for the respective acoustic signal and an earliest failure detection time of the plurality of acoustic signals; and calculating the acoustic weighted position as a weighted average of the respective positions of the plurality of microphones, wherein the respective acoustic weight of each microphone is used to calculate the weighted average.

9. A method as claimed in claim 1, wherein the predetermined relationship between sound pressure level and regions of the duct comprises an empirical relationship describing a variation in time taken for sound pressure level to change from a first level to a second level based on a region of the duct.

10. A method as claimed in claim 1, wherein determining the estimate of a region containing the failure event as a first sub-volume of the duct comprises: determining a preliminary estimate of the region containing the failure event based on the predetermined relationship between sound pressure level and regions of the duct; and determining the estimate of the region containing the failure event based on a spatial relationship between the preliminary estimate of the region containing the failure event, the acoustic weighted position, and the positions of the plurality of microphones.

11. A method as claimed in claim 1, further comprising: discretizing the first sub-volume of the duct into a three-dimensional grid comprising a plurality of voxels according to a first grid mesh size; determining a first estimate of a location of the failure event using a time domain beamforming algorithm applied to the first sub-volume of the duct and the plurality of acoustic signals, wherein the algorithm is configured to, for each voxel of the first sub-volume, combine the plurality of acoustic signals based on the position of the respective microphone relative to a position of the voxel, and determine a first estimate of the location of the failure event based on the combination of the plurality of acoustic signals.

12. A method as claimed in claim 11, wherein determining the first estimate of the location of failure based on the combination of the plurality of acoustic signals comprises: determining a spatial energy map from the combination of a spatial response of the plurality of acoustic signals; and determining the first estimate of the location of failure as a position corresponding to a maximum energy in the spatial energy map.

13. A method as claimed in claim 11, further comprising determining a second estimate of the location of the failure event, comprising: reducing the first sub-volume of the duct to a second sub-volume of the duct based on the first estimate of the location of the failure event; discretizing the second sub-volume into a three-dimensional grid comprising a plurality of voxels according to a second grid mesh size, wherein the second grid mesh size is smaller than the first grid mesh size; determining the second estimate of the location of the failure event using the time domain beamforming algorithm applied to the plurality of acoustic signals and the second sub-volume of the duct.

14. A method as claimed in claim 13, further comprising comparing the first estimate of the location of the failure event and the second estimate of the location of the failure event according to a convergence criteria; and iteratively determining a further estimate of the location of the failure event based on the comparison.

15. A system for detecting a failure event in a pressurized fluid duct, comprising: a plurality of microphones configured to record sound waves in an environment of the pressurized fluid duct to produce a plurality of acoustic signals, wherein each microphone of the plurality of microphones is located at a predetermined position relative to the duct; and processor circuitry coupled to the plurality of microphones, the processor circuitry configured to execute instructions comprising a method according to claim 1.

16. A non-transitory computer readable storage medium storing instructions that, when executed by a processor, causes the processor to perform a method according to claim 1.

17. An apparatus comprising processor circuitry configured to execute instructions comprising a method according to claim 1.

* * * * *